Dec. 12, 1933.  A. C. FISCHER  1,939,004
AIR, MOISTURE, AND SOUND PROOF MATERIAL
Filed Nov. 8, 1919     3 Sheets-Sheet 1
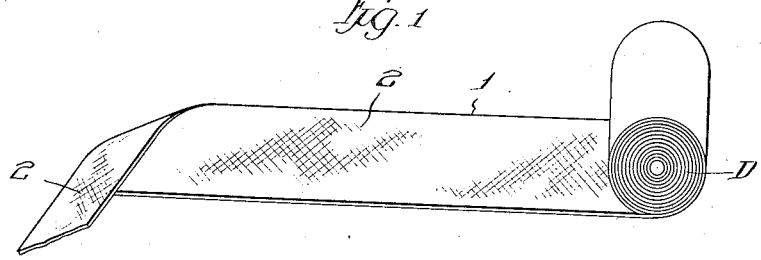
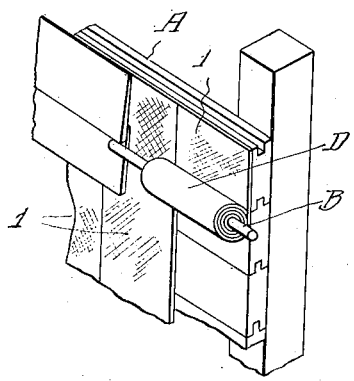
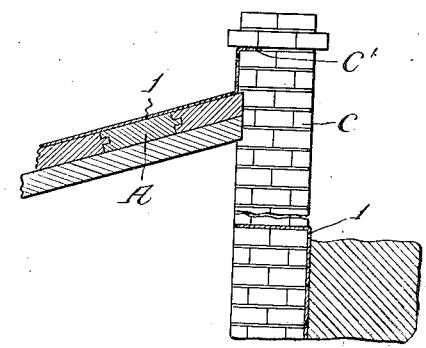
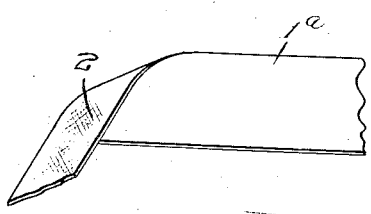
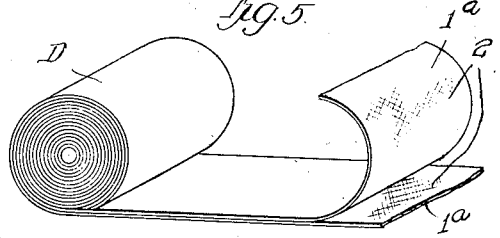
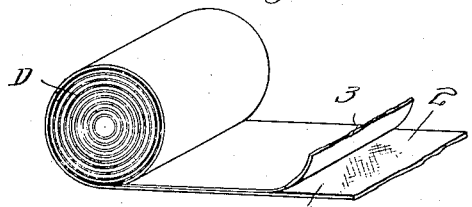
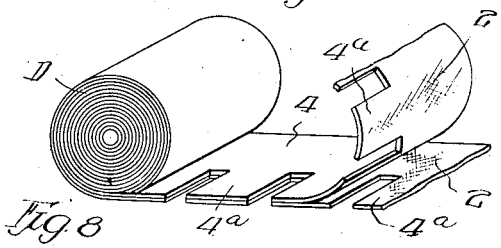
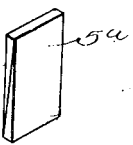
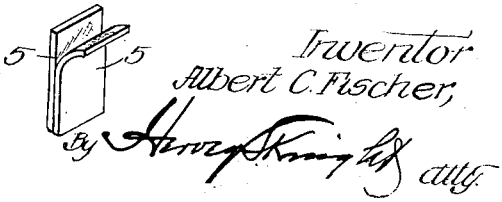
Witness
G. Burkhardt
Inventor
Albert C. Fischer,
By Harry Knight Atty.

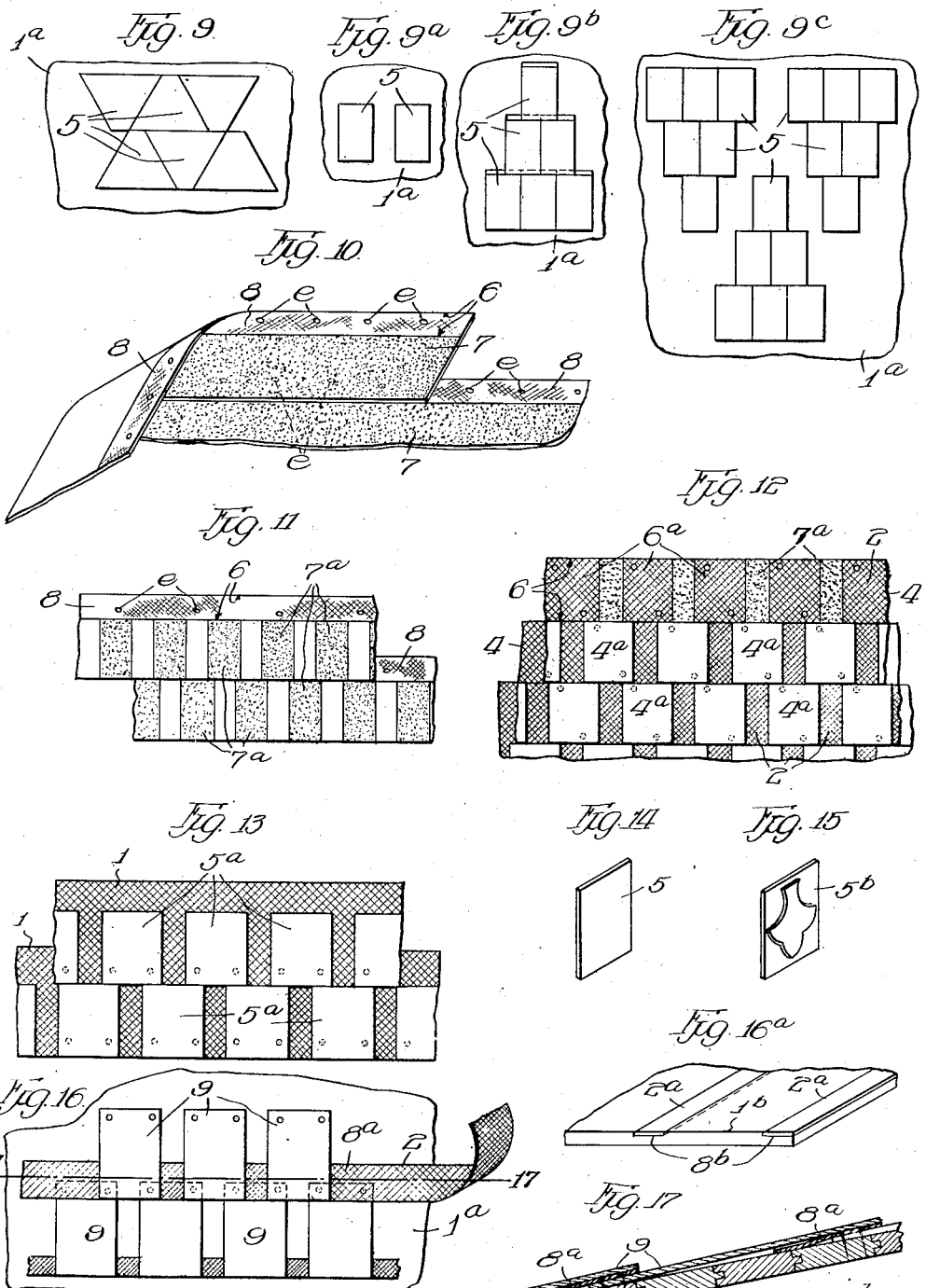

Dec. 12, 1933.  A. C. FISCHER  1,939,004
AIR, MOISTURE, AND SOUND PROOF MATERIAL
Filed Nov. 8, 1919   3 Sheets-Sheet 3
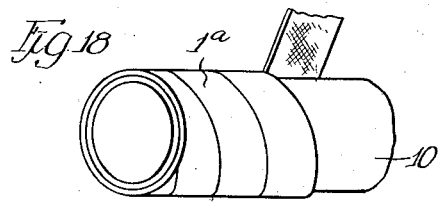
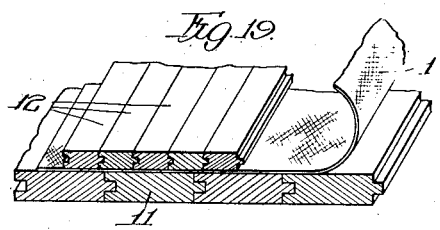
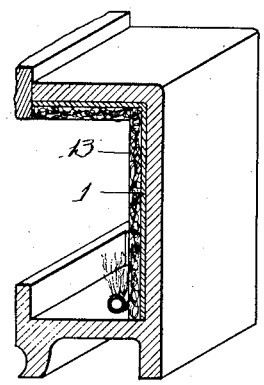
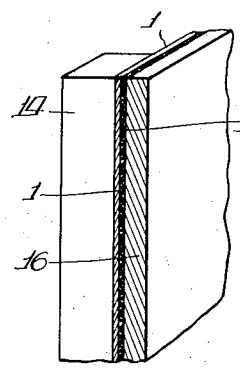
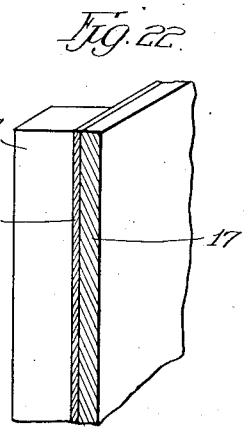
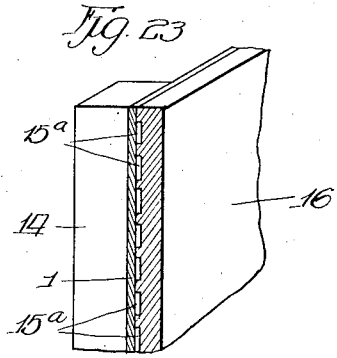
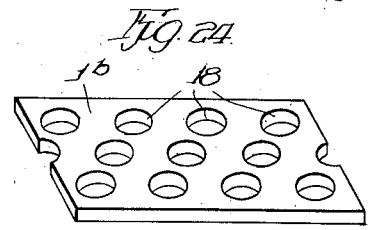
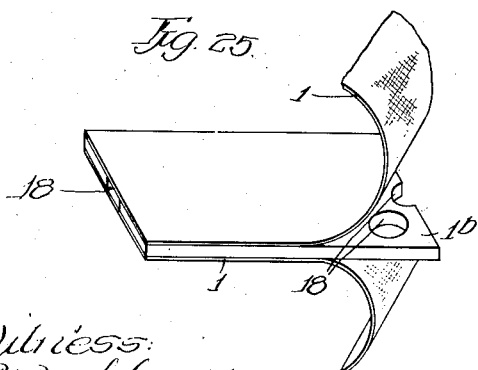
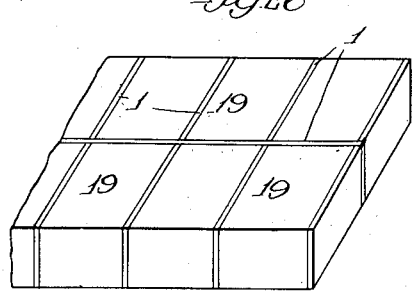

Patented Dec. 12, 1933

1,939,004

UNITED STATES PATENT OFFICE 1,939,004

AIR, MOISTURE, AND SOUND PROOF MATERIAL

Albert Charles Fischer, Chicago, Ill., assignor to The Philip Carey Manufacturing Company, a corporation of Ohio Application November 8, 1919. Serial No. 336,713

19 Claims. (Cl. 154—51)

The object of the present invention is to render proof against the penetration of air, moisture, or sound, building structures such as roofs and walls whether made of plastic or other masonry, or of wood or metal; also floors, surface paving, and the like; and also metal surfaces which it may be desired to protect against corrosion.

The underlying feature of the invention consists in embodying with the structure to be protected, either by introduction thereinto or application to the surface thereof, a readily adhering normally tacky adhesive, preferably of bituminous or asphaltic origin, carried by a thin sheet or web of paper, felt, or the like, which serves as a vehicle therefor and upon which it is spread in a manner to determine the thickness or volume of the normally tacky adhesive to be applied, and to render convenient its distribution upon the surface to be protected; the normally tacky adhesive being produced with the inherent characteristic of maintaining fluidity and adhesiveness so that it will be self-adhering when opened up and applied to the surface which is to receive it, and preferably also in a manner to render it yielding upon the surface which receives it in response to expansion, contraction, or other change in dimensions of such surface.

Any suitable asphaltic or bituminous normally tacky adhesive may be used, such for instance, as pure native asphalts, residual asphalts, blown petroleum asphalts, wurtzilite asphalt and fatty-acid pitch, used either singly or in various combinations when of the required consistency; or else if too hard (and the same applies also to asphaltites) fluxed to grade with one or more of the following, viz.; soft native asphalt, residual oil, soft residual asphalt, soft blown petroleum asphalt, soft fatty-acid pitch, animal and vegetable oils and fats, and wool grease. In particular a most desirable normally tacky cement or adhesive is that known to the trade as Texaco 12/14.5 Gravity Flux, which is a so-called semi-liquid asphalt product and is recovered in the refining process of an asphaltic base petroleum, and has the inherent qualities of remaining tacky or sticky, not drying out or changing its characteristics materially even though exposed to room temperature for several months. A similar material of the same characteristic properties may be purchased in the open market from practically any of the companies dealing in petroleum products.

The range of uses to which the present invention may be put is very wide and varied. For purposes of illustration it may be stated that the invention contemplates the application of the material to surfaces that are to be protected against weather, as, for instance, the weathering surface of a roof, or an outside wall of a building structure, or as a binder or bonding means to cause adhesion to such a roof or wall of another surfacing material, such as felt roofing, finely divided mineral substance, or weathering material in blocks or other subdivided form that may be placed over the material of the present invention; also the introduction of this self-adhering material of lasting fluidity between two wall-producing members, such as sheathing and weather boarding, after the manner of building paper commonly used to render the wall air-tight.

The invention also contemplates the use of the new material in between the courses of masonry, as, for instance, near the base of a wall to prevent dampness arising from the ground, or over the outer surface of that portion of the wall that lies below ground to prevent penetration of dampness; also the introduction of the material in between a plastic surfacing material and the wall upon which it is laid.

The invention also contemplates the use of the material, and particularly of a modified form, in which the normally tacky adhesive is preferably in a thicker layer, as an expansion joint between paving blocks or sections of cement paving; also between upper and lower flooring boards for air, dust, and sound proofing means, or between two sheets or layers of cushioning material used for the same purpose.

The present invention embodies certain improvements in flexible material such as roofing, which is formed of a foundation strip of burlap, felt, or fibrous material saturated with a mastic or adhesive compound to provide a coating layer for adhering with a substructure. The adhesive is preferably of a character which does not dry or set until exposed to the air or to another surface, thereby permitting a sheet to be rolled or packaged and to be in an adhesive state at the time it is unrolled for use.

In the accompanying drawings—

Figure 1 is a view of the simplest form of the flexible self-adhering sheet, namely, that in which the normally tacky adhesive is applied over the entire area of both surfaces.

Figure 2 is a view suggesting a method of applying the self-adhering material.

Figure 3 suggests the use of the material as flashing for roofs, and also as damp-proofing between the base of a masonry wall and the earth.

Figure 4 is a view similar to Figure 1 showing a modified form of the material, according to which the normally tacky adhesive or substance of lasting adhesiveness is applied to one side only.

Figures 5 and 6 show two methods of packaging the material shown in Figure 4.

Figure 7 shows the material in the form of flexible shingle strips, coated on one side in accordance with Figure 4, and packaged in accordance with Figure 5.

Figures 8 and 8a show the application of the invention to individual shingles.

Figures 9, 9a, 9b, and 9c suggest some uses to which the shingles of Figures 8 and 8a may be put.

Figure 10 is a view showing the application of the invention to roofing material having restricted areas of adhesive and weathering material applied over the portion of the surface that is to be exposed in use.

Figure 11 is a view showing the application of the invention as suggested in Figure 10 to roofing material on which the weathering surface is restricted to areas that simulate shingles.

Figure 12 illustrates a method of constructing a roof from flexible shingle strips which embody one form of the present invention.

Figure 13 illustrates a method of developing a shingle or tile roof by the use of self-adhering flexible strips serving as a bonding base.

Figures 14 and 15 suggest forms of shingle or tile to be used in the construction illustrated in Figure 13.

Figure 16 suggests the use of flexible self-adhering material for the purpose of anchoring the free ends of flexible shingles in the construction of a roof and sealing the spaces between shingles, Figure 16a being a modification thereof.

Figure 17 is a section on the line 17—17 of Figure 16.

Figure 18 suggests the employment of the self-adhering material of the present invention as a pipe covering.

Figure 19 suggests the use of the materal of the present invention as a noise or other insulation in flooring.

Figure 20 shows the material of the present invention made of non-inflammable fiber and used as a fire-back or bonding for the porous facing of a gas fire.

Figure 21 shows the use of the material of the present invention as a bonding material for wall plaster, or the like.

Figure 22 is a modification of the use suggested in Figure 21, according to which the material of the invention is used to secure wall board or other surfacing material to a wall.

Figure 23 is a modification of the use suggested in Figure 21, in which lath is employed as a keying means.

Figure 24 shows a form of material embodying the features of the present invention, in which air spaces are formed to better adapt it for sound, heat, and other insulation purposes.

Figure 25 is a modification of the embodiment shown in Figure 24, according to which the cellular sheet is faced with impervious sheets to make dead air pockets in the material itself; and, Figure 26 suggests the application of the material of the present invention as waterproofing and expansion joints in paving.

According to Figure 1, a strip 1 of paper, fabric, roofing felt, or the like, has one and preferably both surfaces coated with an asphaltic or bituminous adhesive 2 which is normally tacky and of lasting fluidity and adhesiveness at least to the extent that when the material is opened up from the roll in which it is packaged for shipment and sale, it will automatically adhere to a surface to which it is applied; so that if the material is used as a roofing or as a building paper it will remain in place upon the surface with which it contacts without the use of nails or other securing means, at least until a securing layer of material or some other securing means may be conveniently applied. For instance, in applying building paper to the sheathing of a wooden building, a roll of the material may be caused to traverse the surface of the structure, as suggested in Figure 2, and if the free edge is securely pressed into contact or anchored, pressure of the roll over the surface will cause each succeeding portion of the material to likewise adhere, and in this way the surface of building paper that is to precede the outer weathering boarding or other weathering material may be developed. This use of the invention is of great convenience in carrying on building construction in windy weather, or permitting the material to be handled by one person.

Obviously, the material of Figure 1 and the method of application as suggested in Figure 2 open up a wide variety of uses to which the material may be put. These will include building surfaces in general, linings for silos, bins, and other receptacles which are to be rendered vermin-proof or water-proof, etc.

Figure 3 suggests the use of the material 1 for the purpose of making waterproof connection between a wooden structure and masonry, as, for instance, in flashing roofs; also waterproofing the base of a masonry wall against which earth lies on the outer side. In these uses the self-adhering nature of the material greatly facilitates its application and improves the construction in which it is embodied. For instance, in introducing the edge of the sheet 1 into the mortar space C' of a brick wall C in flashing the roof, and then repacking the joint with mortar, the lasting adhesiveness of the surfacing material will cause the mortar to adhere after the water has dried out of it; and similarly the sheet material will adhere to any other surface with which it contacts.

As suggested in Figures 4 to 8, 8a, the material may consist of a sheet 1a (Figures 4 to 6) having the normally tacky adhesive 2 on but one side thereof, and this may be packaged as shown in Figure 5 where two of these sheets are brought together with their adhesive faces in contact, then developed into the roll D, and kept in condition which permits them to be readily separated to expose their self-adhering surfaces after being brought up on the site of the building operation. Or the material of Figure 4 may be packaged by applying to its adhesive face, and rolling in with it, a thin paper or other material coated with a substance that does not adhere to the normally tacky adhesive, such, for instance, as water-glass, and which permits the protecting sheet 3 to be readily stripped off when the material is to be used. The roll D, such as suggested in Figure 6, may be applied somewhat after the manner of Figure 2, provided the protecting strip 3 is peeled off in advance of bringing the adhesive surface into contact with the building structure. The sheet 3 after being thus detached may be temporarily useful for various purposes during the progress of the work, as, for instance, by introducing it beneath a portion of the self-adhering surface and the building structure until another sheet to be lapped under a previously applied sheet can be gotten into position. In this way roofing strips may be laid from the top of a roof downward and thus avoid injury to a strip of material after it has been laid.

As shown in Figure 7, the application of the adhesive to but one side is quite as appropriate to roofing material 4 cut with tabs or projections 4a to represent shingles, as also is the method of packaging suggested in Figure 5. The shingle strip might also be packaged as suggested in Figure 6.

Individual shingles 5, 5a may be coated in accordance with the present invention and applied face to face as suggested in Figures 8, and 8a in order to preserve their self-adhering quality during shipment, the shingles being rolled apart at the time of applying them to a roof, and the application being over a previously prepared surface of roofing paper or other material. These shingles may be of any desired shape, and may be of uniform thickness as shown at 5 (Figure 8), or tapering in thickness as shown at 5a (Figure 8a). The method of developing self-adhering surfacing members and packaging the same as suggested in Figures 8 and 8a, is applicable to paving or flooring blocks or material as well as to roofing shingles.

As suggested in Figures 9, 9a, 9b, and 9c, the material shown in Figures 8 and 8a when the parts are separated to expose their self-adhering surfaces, would be very convenient in developing designs upon roofs or other surfaces, as it is merely necessary to lay the members in proper relation upon a previously laid sheet 1a. Moreover, in the application of this material, accuracy of development of design is fixed by the possibility of shifting the block or section of the material in its position while locating it.

Figure 10 illustrates the application of the invention to a roofing or surfacing material intended to be applied by overlapping a portion 6 of each strip with a corresponding width of an adjacent strip, and then restricting the application of the mastic 2 to the overlapped portion or portions. This permits the remaining surface 7, for instance, that which is to be exposed to the weather in a roof, free to receive weathering material or finely divided surfacing substance. Roofing material of this kind can be secured by nails e in the portion that is covered by the overlapping, the adhesive on this portion being relied upon to hold down the free edge of the superposed strip, and the free edge of the lowermost strip on a roof, for instance, being anchored by a narrow strip 8 of material of the kind shown in Figure 1, or that shown in Figure 4.

The construction shown in Figure 10 may be carried forward as shown in Figure 11, by restricting the area of the applied finely divided weathering material to areas such as 7a, and so adapt the strips of material when applied as described in Figure 10 to simulate the shingle effect shown in Figure 11. The application of the normally tacky adhesive 2 to the restricted zone or area 6 may follow the method of Figure 10, and the lower edge of the lowermost sheet may be anchored by the narrow strip of self-adhering material 8, as described in Figure 10.

According to Figure 12, the method of restricting the application of adhesive 2 to a narrow zone 6 or overlapped portion of roofing strips is equally applicable to the strips 4 of Figure 7 cut with tabs 4a to simulate shingles, the shingle tabs being anchored by the adhesive upon the portion of the antecedent strips which they overlap. As suggested at 6a in Figure 12, the adhesive 2 may be further restricted to the areas corresponding to the shingle tabs, while the intervening spaces 7a may be provided with the weathering material or finely divided mineral. In developing these conditions, the continuous band of adhesive 2 will be applied along the restricted area 6 in Figure 12, and the intershingle space 7a will then be impressed with or otherwise coated with the mineral substance, which the adhesive will serve to hold in place.

According to Figure 13, strips 1 are applied after the usual manner of paper roofing with suitable overlapped areas, and individual shingles, tiles, or the like 5a are placed in position thereon and held by the adhesive. As suggested in Figures 14 and 15, these tiles or shingles might take the form 5 (Figure 14) or any other form 5b (Figure 15); the design produced in relief upon the tile 5b being preferably such as to leave an adhering margin entirely around the edge of the tile.

Figure 16 shows another method of laying individual shingles, tiles, or the like. These may consist of slabs or plates 9 of slate, or cement, or other composition, applied to the roof or exterior building wall in the usual way by nailing them above their exposed surfaces. In the present instance, however, the narrow strip 8 coated with normally tacky adhesive material is laid across the upper lapped ends of the plates 9 to seal the nails, and also to serve as a bonding for the lower free edges of the plates. This bonding strip may be relatively narrow, as shown at 8, particularly when located beneath the first course of the plates 9, but it is preferably of greater width, as shown at 8a in Figures 16 and 17, in order that it can contact with the sheathing or other foundation beyond the upper edges of the plates, and thus made to secure the bridging portions of the anchoring strip.

As shown in Figure 16a, in order to maintain evenness in developing a structure by overlapping sheets, the feature of providing a restricted zone of mastic may be realized by developing countersunk channels 8b in the surface of a sheet 1b, and filling the same with mastic 2b. Except where it may be more convenient to use the flexible strip 8 as a vehicle in introducing this mastic into these channels, the strip may be omitted. Moreover, this method of defining a restricted zone of mastic permits the development of a deeper thickness of mastic.

According to Figure 18, the material of the present invention, particularly when made of asbestos or other non-combustible material, affords a convenient pipe covering, the strip 1a being wound upon the pipe 10, with or without edge lapping, in spiral form, and the layers being duplicated or multiplied if desired.

Figure 19 shows the application of the sheet 1 of the present invention as a bonding, tightening, or insulating material between two layers of a wooden structure, as, for instance, rough flooring 11 and surface flooring 12. Its application to this use is very convenient because of retaining its position, the flowing of the adhesive into cracks, and yielding to expansion and contraction of the wood.

In Figure 20, the sheet 1 with adhesive on both sides is applied as a bonding material to hold asbestos or mineral wool 13 to a fire back. In Figure 20, as well as Figure 18, the adhesive will preferably be of fireproof composition.

In Figure 21, the sheet 1 with normally tacky adhesive on both sides thereof, and preferably of heavy gauge so that it may be extended between studs 14, is located beneath expanded metal 15 or other keying structure upon which is applied ordinary wall plaster 16. When the plaster 16 dries, by the escape of its moisture outwardly, the normally tacky adhesive on the sheet 1 will still retain adhesiveness and will so adhere to the dry mortar as to greatly reinforce the keying effect.

According to Figure 22 the sheet 1 applied to studs 14 serves as a bonding or holding back for wall board 17.

According to Figure 23 lath 15a is substituted for the expanded metal 15 to receive plaster 16 as described in Figure 21; but in this instance the lath may be permanently secured to the sheet 1 and supplied with it from the factory. By the process of adhering the mortar to the adhesive on the sheet 1 after the mortar becomes dry, the keying effect of the lath 15a is greatly reinforced, and a shallower key may thus be employed than where the lath alone is relied upon to hold the mortar.

In Figure 24 the sheet 1b is provided with perforations 18 which, when the sheet is introduced between two layers of a building structure, for instance, the floorings 11 and 12 of Figure 19, or between sheathing and weather boarding of a house, wall, or the different skins of a refrigerator wall, will provide dead-air pockets, and correspondingly increase insulation.

As suggested in Figure 25, the dead-air pockets may be developed by applying to the sheet 1b of Figure 24 two sheets 1 or 1a, the normally tacky adhesive on the outer surface of sheet 1 leaving the composite structure self-adhesive when finished. Similarly, multiple ply insulating material could be built up by taking a plurality of perforated sheets 1b with intervening sheets 1 or 1a.

Figure 26 indicates the use of the material of the present invention as a packing between the abutting faces of paving blocks 19. By having the sheets 1 of Figure 1 or the material of Figure 24 or Figure 25 introduced in between the paving blocks 19, the joints will be sealed against penetration of moisture, and the packing will be amply yielding to compensate for expansion and contraction of building blocks due to heat and cold. The material will serve well for expansion joints of cement paving laid in situ.

An important advantage of material such as herein described when applied to many of the uses herein selected for illustration, is that the lasting adhesiveness or fluidity of the adhesive permits the parts of the structure to draw relatively to the self-adhering material and thus avoid tearing the latter, and leaving it quite effective in sealing cracks that may open in wooden or other structures.

By the method of building up a structure by first applying a sheet of material coated with the normally tacky adhesive of lasting stickiness and then laying another sheet over it, the surplus normally tacky adhesive is largely taken up by the superposed sheet, and ultimate setting of the normally tacky adhesive is favored.

I claim:

1. As a new article of manufacture, building material comprising a self adhering sheet of fibrous substance having on each of its outer surfaces an adhesive of lasting fluidity.

2. As a new article of manufacture, flexible building material composed of self adhering sheets comprising weathering portions and underlapping portions; the underlapping portions having applied thereto an adhesive of lasting fluidity.

3. As a new article of manufacture, building material comprising self attaching flexible sheets having upon restricted areas of their surface adhesive material of lasting fluidity.

4. As a new article of manufacture, self attaching building material having countersunk in its surface a restricted zone of mastic of lasting stickiness.

5. As a new article of manufacture, building material comprising a self attaching sheet of flexible material having countersunk in its surface a restricted zone of mastic of lasting stickiness.

6. As a new article of manufacture, self attaching building material having its surface scored or channeled to provide a depression therein, and having such depression filled with a mastic substance of continuing stickiness.

7. As a new article of manufacture, building material comprising a self attaching sheet of flexible material having its surface scored or channeled to depress the same and having its depressed portion filled with a mastic substance of continuing stickiness.

8. As a new article of manufacture, building material comprising self attaching flexible sheets having upon restricted areas of their surfaces adhesive material of lasting fluidity and fashioned to form continuous anchoring strips and shingle-like tabs spaced thereon.

9. As a new article of manufacture, building material comprising flexible sheets having upon restricted areas of their surfaces adhesive material of lasting fluidity, said sheets being fashioned to form continuous anchoring strips and shingle-like tabs spaced thereon; the adhesive being applied to the anchoring-strip portions of the sheets and restricted to areas thereof corresponding to tab-portions of an adjacent sheet to be lapped thereon in use.

10. As a new article of manufacture, building material comprising flexible sheets having upon restricted areas of their surfaces adhesive material of lasting fluidity, said sheets being fashioned to form continuous anchoring strips and integral tabs spaced thereon; the adhesive being applied to the anchoring-strip portions of the sheets and restricted to areas thereof corresponding to tab-portions of an adjacent sheet to be lapped thereon in use; the areas of said anchoring strips between the adhesive areas being provided with a weathering material.

11. As a new article of manufacture, self-adhering building shingles having each a face coated with an adhesive of lasting fluidity, and a readily removable protecting sheet applied to said adhesive.

12. As a new article of manufacture, self adhering building shingles having each a face coated with an adhesive of lasting fluidity, and a readily removable protecting sheet applied to said adhesive; said shingles having a continuous anchoring strip from which they integrally project.

13. As a new article of manufacture, a sheet of self adhering flexible building material having upon a face thereof an adhesive of lasting fluidity, and with a protecting sheet laid thereover; said first sheet being fashioned to provide integral shingle-simulating tabs spaced thereon.

14. As a new article of manufacture a self-adhering flexible roofing material, carrying a slow-setting adhesive that adapts the material to adhere to a surface or to another piece of roofing material with which it is brought into contact.

15. As a new article of manufacture a self-adhering flexible roofing material carrying upon both sides thereof a slow-setting adhesive that adapts the material to adhere to a surface on which it is laid, and also bind to itself roofing material laid upon it.

16. As a new article of manufacture a roll of roofing material, having upon its surface a coating of lasting adhesiveness, and a protective envelope resisting atmospheric effects upon said adhesive.

17. Roofing material comprising a strip of roofing felt having both faces coated with a waterproof mastic of substantially lasting adhesiveness, whereby said strip will automatically adhere to a surface when contacted therewith.

18. Constructional material adapted to be applied to the surface of building structures, such as roofs, walls, floors and other surfaces, comprising a sheet of flexible material having both faces coated with a bituminous adhesive of substantially lasting adhesiveness, whereby said sheet when applied to such building surface will instantly adhere thereto.

19. Constructional material adapted to cover the surface of a building structure or the like, comprising a strip of flexible sheet material having at least one face carrying a coating of mastic of substantially lasting adhesiveness, whereby said strip will automatically adhere to said surface when contacted therewith.

ALBERT CHARLES FISCHER.